(12) United States Patent
Yuksel et al.

(10) Patent No.: US 11,794,918 B2
(45) Date of Patent: Oct. 24, 2023

(54) METHOD OF OPERATING AN ACTUATOR SYSTEM, ACTUATOR SYSTEM, AND AIRCRAFT COMPRISING SAID METHOD AND SYSTEM

(71) Applicant: Volocopter GmbH, Bruchsal (DE)

(72) Inventors: Burak Yuksel, Heidelberg (DE); Ulrich Schaferlein, Karlsdorf (DE); Tobias Vermeulen, Munich (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 327 days.

(21) Appl. No.: 17/086,826

(22) Filed: Nov. 2, 2020

(65) Prior Publication Data
US 2021/0163144 A1 Jun. 3, 2021

(30) Foreign Application Priority Data
Dec. 2, 2019 (EP) ..................................... 19212935

(51) Int. Cl.
*B64D 31/06* (2006.01)
*B64C 29/00* (2006.01)
*B64D 27/24* (2006.01)

(52) U.S. Cl.
CPC .......... *B64D 31/06* (2013.01); *B64C 29/0025* (2013.01); *B64D 27/24* (2013.01)

(58) Field of Classification Search
CPC .... B64D 31/06; B64D 27/24; B64C 29/0025; B64C 19/00; G05D 1/0858; G05B 13/042; H02P 5/00
See application file for complete search history.

(56) References Cited

U.S. PATENT DOCUMENTS

| 4,159,444 A * | 6/1979 | Bartlett ................ G05D 1/0077 318/564 |
| 10,931,163 B2 * | 2/2021 | Estival ................. H02K 1/2773 |

(Continued)

FOREIGN PATENT DOCUMENTS

| CN | 105138003 A | 12/2015 |
| CN | 106707749 A | 5/2017 |

(Continued)

OTHER PUBLICATIONS

Chinese Office Action for corresponding Chinese Application No. 202011330514.5 dated Apr. 28, 2023, 7 pages long and machine translation.

*Primary Examiner* — Donald J Wallace
*Assistant Examiner* — Jalal C Coduroglu
(74) *Attorney, Agent, or Firm* — Volpe Koenig

(57) ABSTRACT

A method of operating an actuator system (1) having a number k, k∈ℕ, of actuators (2), in particular individual propulsion units of an MAV-VTOL aircraft (10), in particular electrically powered actuators, wherein a desired control command $u_p \in \mathbb{R}^m$, m∈ℕ, for controlling the actuator system (1) is allocated to real actuator commands $u \in \mathbb{R}^k$, k∈ℕ, by using a weighted allocation matrix D (W), from an equation $u = D^{-1}(W)u_p$, wherein $D^{-1}(W)$ is an inverse of the weighted allocation matrix, and the real actuator commands u are applied for controlling the actuators (2). The method includes determining a characterizing value u* from the real actuator commands u; determining, at least for some of the actuators (2), preferably for all of the actuators (2), a deviation $e_i$, i=1, 2, ..., k of a respective actuator command $u_i$, i=1, 2, ..., k from said characterizing value u*; determining, at least for some of the actuators (2), preferably for all of the actuators (2), a weight $w_i$, i=1, 2, ..., k for a given actuator (2) as a function $w_i(e_i)$, i=1, 2, ..., k of said deviation $e_i$; and using the weights $w_i$ for determining said (Continued)

weighted allocation matrix D(W). An actuator system which is operated according to this method and an aircraft with a plurality of propulsion units as a specific use case are also provided.

15 Claims, 5 Drawing Sheets

(56) References Cited

U.S. PATENT DOCUMENTS

| | | | | |
|---|---|---|---|---|
| 2004/0107013 A1* | 6/2004 | Fuller | ............... | G05B 13/042 |
| | | | | 700/74 |
| 2008/0237392 A1* | 10/2008 | Piasecki | ............... | B64C 27/82 |
| | | | | 244/6 |
| 2009/0157238 A1* | 6/2009 | Le Bastard | ............... | G05B 9/03 |
| | | | | 701/4 |
| 2011/0225963 A1* | 9/2011 | Delbos | ............... | B64C 1/1407 |
| | | | | 60/459 |
| 2013/0334372 A1* | 12/2013 | Marques | ............... | B64C 13/16 |
| | | | | 244/76 R |
| 2014/0231591 A1* | 8/2014 | Higuchi | ............... | G05D 1/0858 |
| | | | | 244/175 |
| 2017/0106966 A1* | 4/2017 | Himmelmann | ............... | B64C 1/22 |
| 2019/0202546 A1* | 7/2019 | Mahboubi | ............... | G05D 1/102 |
| 2020/0241567 A1 | 7/2020 | Zwiener et al. | | |

FOREIGN PATENT DOCUMENTS

| | | |
|---|---|---|
| CN | 107168055 A | 9/2017 |
| CN | 110134135 A | 8/2019 |
| DE | 102019101903.6 | 7/2020 |
| JP | H07287602 A | 10/1995 |
| WO | 2007018572 A2 | 2/2004 |

\* cited by examiner

METHOD OF OPERATING AN ACTUATOR SYSTEM, ACTUATOR SYSTEM, AND AIRCRAFT COMPRISING SAID METHOD AND SYSTEM

INCORPORATION BY REFERENCE

The following documents are incorporated herein by reference as if fully set forth: European Patent Application No. 19212935.1, filed Dec. 2, 2019.

TECHNICAL FIELD

The invention relates to a method of operating an actuator system comprising a number k, k∈$\mathbb{N}$, of actuators, in particular individual propulsions units of an MAV-VTOL aircraft.

The invention also relates to an actuator system comprising a number k, k∈$\mathbb{N}$, of actuators, in particular individual propulsions units of an MAV-VTOL aircraft.

The invention further relates to an aircraft in the form of a multiactuator aerial vehicle, MAV, with vertical take-off and landing, VTOL, capacity comprising a plurality of k, k∈$\mathbb{N}$, actuators in the form of propulsion units for moving the aircraft and comprising a flight control unit for controlling the actuators.

BACKGROUND

In overly determined actuator systems, e.g. aircraft in the form of multiactuator aerial vehicles (MAVs), there are different possibilities to achieve given tasks, such as a given flight direction, by using allocation algorithms, which are performed by a (flight) control unit of the actuator system or aircraft. A given task can be allocated in different ways/portions to the different actuators, which may be devised as individual propulsion units of the MAV. One way to do this has been described in German application DE 10 2019 101 903.6, filed by the present applicant. Generally speaking, an allocation algorithm is implemented to find a solution to a given task while minimizing the squared sum (L−2 norm) of all actuator commands (for energy efficiency).

So far, no allocation method has been described in the prior art which considers minimizing the maximum power demand of all actuators. This is also referred to as the L-infinity norm of all actuators. Minimizing said L-infinity norm in the allocation results in better power distribution between multiple actuators in an overly determined system.

SUMMARY

It is the object of the present invention to provide a method, an actuator system and an aircraft comprising multiple actuators in the form of propulsion units which achieve better distribution of required actuator command power between the actuators while reducing a maximum required command power, thus positively affecting a possible design of the actuator system in terms of total energy consumption, cost, weight and/or size.

The object is achieved by a method having one or more features as described herein, by an actuator system having one or more features as described herein, and by an aircraft having one or more features as described herein.

Advantageous further embodiments are defined below and in the claims.

According to a first aspect of the invention, a method of operating an actuator system comprising a number k, k∈$\mathbb{N}$, of actuators, in particular individual propulsion units of an MAV-VTOL aircraft, in particular electrically powered actuators, wherein a desired control command $u_p \in \mathbb{R}^m$, m∈$\mathbb{N}$, for controlling the actuator system is allocated to real actuator commands $u \in \mathbb{R}^k$, k∈$\mathbb{N}$, by using a weighted allocation matrix D(W), from an equation $u=D^{-1}(W)u_p$, wherein $D^{-1}(W)$ is an inverse of the weighted allocation matrix, and wherein the real actuator commands u are applied for controlling the actuators, comprises:
 a) determining a characterizing value u* from the real actuator commands u;
 b) determining, at least for some of the actuators, preferably for all of the actuators, a deviation $e_i$, i=1, 2, ..., k of a respective actuator command $u_i$, i=1, 2, ..., k from said characterizing value u*;
 c) determining, at least for some of the actuators, preferably for all of the actuators, a weight $w_i$, i=1, 2, ..., k for a given actuator as a function $w_i(e_i)$, i=1, 2, ..., k of said deviation $e_i$; and
 d) using the weights $w_i$ for determining said weighted allocation matrix D(W).

According to a second aspect of the invention, in an actuator system comprising a number k, k∈$\mathbb{N}$, of actuators, in particular individual propulsion units of an MAV-VTOL aircraft, in particular electrically powered actuators, and comprising a control unit for controlling the actuator system with a desired control command $u_p \in \mathbb{R}^m$, m∈$\mathbb{N}$, which desired control command is allocated, by said control unit, to real actuator commands $u \in \mathbb{R}^k$, k∈$\mathbb{N}$, by using a weighted allocation matrix D(W), from an equation $u=D^{-1}(W)u_p$, wherein $D^{-1}(W)$ is an inverse of the weighted allocation matrix, and wherein the real actuator commands u are applied, by the control unit, to the actuators, the control unit is adapted to implement
 a) determining a characterizing value u* from the real actuator commands u;
 b) determining, at least for some of the actuators, preferably for all of the actuators, a deviation $e_i$, i=1, 2, ..., k of a respective actuator command $u_i$, i=1, 2, ..., k from said characterizing value u*;c) determining, at least for some of the actuators, preferably for all of the actuators, a weight $w_i$, i=1, 2, ..., k for a given actuator as a function $w_i(e_i)$, i=1, 2, ..., k of said deviation $e_i$; and
 d) using the weights $w_i$ for determining said weighted allocation matrix D(W).

According to a third aspect of the invention, in an aircraft in the form of a multiactuator aerial vehicle, MAV, with vertical take-off and landing, VTOL, capacity comprising a plurality of k, k∈$\mathbb{N}$, actuators in the form of propulsion units for moving the aircraft and comprising a flight control unit for controlling the actuators with a desired control command $u_p \in \mathbb{R}^m$, m∈$\mathbb{N}$, which desired control command is allocated, by said flight control unit, to real actuator commands $u \in \mathbb{R}^k$, k∈$\mathbb{N}$, by using a weighted allocation matrix D(W), from an equation $u=D^{-1}(W)u_p$, wherein $D^{-1}(W)$ is an inverse of the weighted allocation matrix, and wherein the real actuator commands u are applied, by the control unit, to the actuators, the flight control unit is adapted to implement
 a) determining a characterizing value u* from the real actuator commands u;
 b) determining, at least for some of the actuators, preferably for all of the actuators, a deviation $e_i$, i=1, 2, ..., k of a respective actuator command $u_i$, i=1, 2, ..., k from said characterizing value u*;

c) determining, at least for some of the actuators, preferably for all of the actuators, a weight $w_i$, i=1, 2, ..., k for a given actuator as a function $w_i(e_i)$, i=1, 2, ..., k of said deviation $e_i$; and d) using the weights $w_i$ for determining said weighted allocation matrix D(W).

If an actuator system is overly determined, one can still minimize the L-2 norm of all actuators for minimizing the energy consumption in a weighted allocation algorithm while solving a given task. Weights of each actuator are assigned for minimizing the L-infinity norm of the actuator commands, such that the maximum control demand of all actuators is reduced.

The basic physical and mathematical considerations underlying the present invention will now be explained in further detail:

Within the present description, "Multiactuator Aerial Vehicles (MAV)" are flying platforms, the lift and all other motion capabilities of which are accomplished owing to an actuator system (comprising a plurality of propulsion units) distributed onboard.

Within the present description, "Vertical Take-off and Landing (VTOL)-MAVs" are flying platforms which can take-off and land in hover condition with almost or exactly zero horizontal velocity.

Within the present description, "overly determined MAVs" are flying platforms which have a redundant number of actuators for completing a certain task.

Within the present description, "under-actuated MAVs" are flying platforms which cannot perform all motion tasks in their operation space (e.g. 3D, i.e., 3 translations and 3 rotations) with all dimensions being independent (or decoupled) from each other.

For example, an off-the-shelf quadrotor VTOL (all actuators are facing upwards) is an under-actuated VTOL-MAV, because it needs to tilt (roll and/or pitch) in order to move horizontally (coupled dimensions). It can however perform vertical or yaw motion independently from each other. Notice that a quadrotor can control roll, pitch, yaw, vertical motion directly; hence four dimensions out of six (in 3D).

For example, an off-the-shelf octorotor VTOL (all actuators are facing upwards) is an overly determined under-actuated VTOL-MAV, because it performs the same tasks as a quadrotor, but with eight actuators.

For example, the Volocopter® aircraft designed by the applicant with its 18 actuators also has to be considered as an overly determined, yet under-actuated VTOL-MAV.

Note: In the above-mentioned examples, a tilt angle of the actuators with respect to the aircraft body has been neglected, i.e., the rotors are considered as being aligned in linearly dependent fashion (or with small tilt angles), e.g., they all (noticeably) face upwards.

For control of a MAV-VTOL, a feed-back control algorithm is used in the aircraft's flight control unit which computes the desired control values, e.g., for an under-actuated MAV-VTOL the desired roll, pitch, yaw torques (unit: Nm) and thrust (unit: N). Typically, all these four values are put in a vector called $u_p \in \mathbb{R}^m$ for m=4, where right subscript "p" stands for "pseudo command". The actual command sent to the actuators is denoted $u \in \mathbb{R}^k$, where k=8 for an octorotor and k=18 for the Volocopter®. During control allocation, the desired pseudo command $u_p$ is allocated to the real actuator commands $u \in \mathbb{R}^k$, where for an overly determined MAV-VTOL k>m.

In a corresponding embodiment of the aircraft, the flight control unit can be connected to a sensor system of the aircraft for to determine said desired control command $u_p \in \mathbb{R}^m$, m∈ℕ, from a (feedback) control law.

A common way of computing u from $u_p$ is using pseudo-inversion of an allocation matrix, which is denoted here by D and which may comprise the following information:
- respective geometric locations (position and orientation) of the actuators w.r.t. the body-fixed frame of the MAV;
- physical capabilities of the actuators, e.g., the forces (N) and torques (Nm) they apply at their respective locations;
- a relationship between the physical capabilities (N, Nm) and the units of the actual commands, i.e. u.

For example, a standard rotor (or a propeller driven by, e.g., a brushless electric motor), usually accepts RPM (or radian/second) commands since most off-the-shelf brushless electric motors are driven via speed commands (because tracking velocity commands are more robust). Hence a relationship between the RPM and the generated forces and torques of a rotor can be defined as a function of the rotor's aerodynamic characteristics, e.g.

$$f_i = p_3 u_i^3 + p_2 u_i^2 + p_1 u_i + p_0$$

$$\tau_i = q_3 u_i^3 + q_2 u_i^2 + q_1 u_i + q_0, \quad \text{(Eq. 1)}$$

where $f_i$ is the lift force generated by the i-th rotor along an axis of rotation and $\tau_i$ is the drag torques around the axis of rotation of the i-th rotor. The parameters $p_j$, $q_j$, $\forall j=1,2,3$ can be identified from the aerodynamic characteristics of the rotor.

For control purposes, it is common to assume that $p_3 = q_3 = 0$.

The aforementioned allocation matrix can be shown to be defined by:

$$u_p = Du, \quad \text{(Eq. 2)}$$

where $D \in \mathbb{R}^{m \times k}$. Hence the actual actuator commands can be computed from the desired pseudo commands as:

$$u = D^{-1} u_p. \quad \text{(Eq. 3)}$$

Since k≠m, the inverse of the allocation matrix is some sort of pseudo inverse. For overly determined systems, e.g., in the case of k>m, this inversion results in more than one solution.

A usual way of approaching this problem is solving the pseudo inverse by optimizing some criteria, e.g., the Moore-Penrose inverse which minimizes the L-2 norm of u, that is $\|u\|_2 = u^T u = \sum_{i=1}^{k} u_i^2$. This makes sure that an energy-optimum solution has been found (e.g., in case of u being the RPM of the rotors, the L-2 norm of u relates to a kinetic energy).

However, minimizing the L-2 norm of the commanded actuator inputs does not guarantee that the supremum of all actuator commands is minimized as well.

In the present description, the "supremum" of a set is the maximum of its all entities: sup(u)=max (u) and represents a particular characterizing value u*.

Minimizing the supremum of all actuator commands can have great impact in design: if an equivalent solution could be found with a reduced sup(u), this would imply that less powerful actuators would be sufficient for accomplishing a given task. Note that since in general (e.g. MAVs with rotors) the power required by an actuator monotonically increases with the actuator command u, a reduction in sup (u) implies a reduced maximum power consumption for that actuator. Being able to use less powerful actuators has a direct effect on the cost and the weight of the overall actuator/aircraft system.

In this disclosure, we propose a control allocation algorithm, which:
- ensures that desired $u_p$ are provided,
- achieves an energy optimum (by minimization of the L-2 norm of u),
- reduces the maximum power demand, thus allowing design optimization (by minimization of the L-infinity norm of u).

The first two items mentioned above can be accomplished using standard methods, e.g. first one using a state feedback control and the second one via pseudo-inversion of the allocation matrix. Moreover, in the context of the invention, we use a weighted inversion in the following form:

$$u = D^{-1}(W)u_p, \quad (Eq.\ 4)$$

where a possible weighted inverse can take the form, thus obtaining an energy minimizing solution:

$$D^{-1}(W) = W^{-1}D^T(DW^{-1}D^T)^{-1}, \quad (Eq.\ 5)$$

with a possible weight matrix W being diagonal, e.g., $$W = \operatorname{diag}(w_1, w_2, \ldots, w_k) = \begin{bmatrix} w_1 & 0 & 0 \\ 0 & \ddots & 0 \\ 0 & 0 & w_k \end{bmatrix} \in \mathbb{R}^{k \times k}.$$

Each actuator can be weighted differently, with values $w_i$ ranging between 0 and 1, i.e., $w_i \in [0,1]$, $\forall i=1, 2, \ldots, k$. Zero (0) weight implies "punishing" that individual actuator and excluding it from the solution, and weight One (1) means full involvement of that actuator in the solution.

In an embodiment of the present invention, we propose weighting the actuators based on how far they diverge (individually) from a characterizing value u* in the form of a mean value of the all actuator commands. Hence, the mean value of the overall actuator commands is used as a "desired equilibrium", which implies looking for an allocation solution where the commands and the demanded power are (is) distributed equally between multiple actuators. This approach can be used to "punish" those actuators which require more power than the characterizing value u*, i.e., said mean value, by reducing their weight as their demand w.r.t. the mean demand increases further.

Therefore, in a further embodiment of the method according to the invention, said characterizing value u* is a mean value of an entirety of the actuator commands u, i.e., $u^* = u_{mean} = \operatorname{mean}(u)$.

Notice that this assumes a direct connection between the actuator command and actuator demand, under the valid assumption that an actuator command increases monotonically with its demand (if the demand of an actuator increases, it shall be commanded with increasing command values to fulfil that demand). Hence, this approach—advantageously—does not require using any data from the actuators for implementing the method. However, the quality of the method could be improved if data from the actuators were available. In this case the current measured actuator state can be used in order to validate the overuse of one or more actuators, or u and u* can be acquired from the sensor data of the actuators if available, instead of using the computed ones. The present method does not rely on such measurements, but it can be improved if actuator state data is available.

$u_{mean} = \operatorname{mean}(u)$ can be defined as the mean value of all actuator commands. A normalized error for each actuator, which takes into account a difference between its commanded value $u_i$ and said mean value, can be defined as $$e_i = \operatorname{normalized}(u_i - u_{mean}) = \frac{(u_i - u_{mean})}{(u_{max} - u_{min})},$$

$\forall i=1, 2, \ldots, k$. If $e_i > 0$. Then, a weight for the i-th actuator can be computed as $w_i(e_i)$, which is a function of the normalized error (or a positive divergence from the mean value). With increasing values of $e_i$, we can reduce $w_i$. Preferably, if $e_i \leq 0$, then $w_i = 1$. These weights are then used for solving the allocation problem in a following cycle of a control iteration performed by the (flight) control unit (see FIG. 5 for a detailed description of the algorithm).

As stated before, in a corresponding further embodiment of the method according to the invention, said deviation $e_i$ is a normalized deviation determined by $$e_i = \operatorname{normalized}(u_i - u^*) = \frac{(u_i - u^*)}{(u_{max} - u_{min})},$$

wherein $u_{max}$ is a (commandable) maximum value and $u_{min}$ is a (commandable) minimum value of the actuator commands $u_i$ (for the i-th actuator, i.e. if aircraft consists of actuators with identical specifications then there is one $u_{max}$ and one $u_{min}$).

In a further embodiment of the method according to the invention, a weight $w_i$ is computed if a corresponding deviation $e_i$ is greater than a given value, e.g., zero, i.e., $e_i > 0$.

In another embodiment of the method according to the invention, a weight $w_i$ is set to a default value, in particular $w_i = 1$, if a corresponding deviation $e_i$ is equal to or smaller than a given value, e.g., zero, i.e., $e_i \leq 0$.

In yet another embodiment of the method according to the invention, a weight $w_i$ is reduced for an increasing value of the respective deviation $e_i$.

In a preferred embodiment of the method according to the invention, the weights $w_i$ which have been determined at a given time are used to solve the equation $u = D^{-1}(W)u_p$ during a subsequent iteration step of the method.

Possible weighting functions are:
- a variety of sigmoid functions. See FIG. 2 for a sigmoid-like weighting function in the form of $$w_i = 1 - \frac{1}{e_i^\gamma},$$

where the figure is plotted for different values of $\alpha$ and $\beta$. Here, $e^x$ is the Euler exponential.
- polynomial functions. See FIG. 3 for a comparison of a weighting polynomial $w_i = 1 - 3e_i^2 + 2e_i^3$ with a sigmoid-like function as mentioned above with $\alpha = 6$ and $\beta = 2$.
- Low-pass filtered exponential functions. See FIG. 4 for the exponentially decaying weighting function (solid line) as $$w_i = \frac{1}{1 + e^{\alpha(\beta e_i - 1)}},$$

for $\gamma = 4$, and its low-pass filtered version (dashed line) according to $w_i = (1-\sigma)w_i + \sigma w_i^{prev}$ for $\sigma = 0.99$. Notice that both $\gamma$ and $\sigma$ are positive valued design parameters. $w_i^{prev}$ denotes a weight from a previous iteration step.

Notice that since there is a discontinuity in the weighting algorithm (if/else), smoothness around zero error is important. A low-pass filtered exponential weight function provides smoothness in this region, as well as in case of other artificial discrete jumps in the weight function due to, e.g., other if/else command in the algorithm. Hence a low-pass filtered exponential function is particularly recommended.

Low-pass filters can also be used with other weighting functions as presented above.

Accordingly, in a further embodiment of the method according to the invention, the weights $w_i(e_i)$ are determined by using a weighting function, which weighting function preferably is a) a sigmoid function, $w_i=1/((1+e^{\alpha(\beta e_i-1)})$, $e^x$ being the Euler exponential;
b) a polynomial function, $w_i=\Sigma_j \alpha_j e_i^j$; or
c) an exponential function, $1-1/e_i^\gamma$.

In yet a further embodiment of the method according to the invention, the weighting function is low-pass filtered, preferably according to $$w_i=(1-\sigma)w_i+\sigma w_i^{prev},$$

with $\sigma<1$, for example $\sigma=0.99$, wherein prev denotes a previous, preferably a directly preceding weight from a preceding iteration step in the operating method.

In further embodiments of the actuator system or the aircraft, said (flight) control unit is further adapted to implement any one of the further method steps described above as further embodiments of the inventive method.

Preferably, in a further embodiment of the aircraft, the propulsion units are electrically powered. Most preferably, they are devised as individual motor-propeller units.

With the proposed invention, there is an improved power distribution between actuators, which implies enhanced heat distribution and less over-usage of individual actuators, etc. Further, since maximum power is a direct design criterion for actuators, minimizing maximum actuator can directly affect the size and weight of the aircraft.

BRIEF DESCRIPTION OF THE DRAWINGS

Further characteristics and advantages of the invention will now be explained in connection with the appended drawings, wherein.

DETAILED DESCRIPTION

Figure 1:
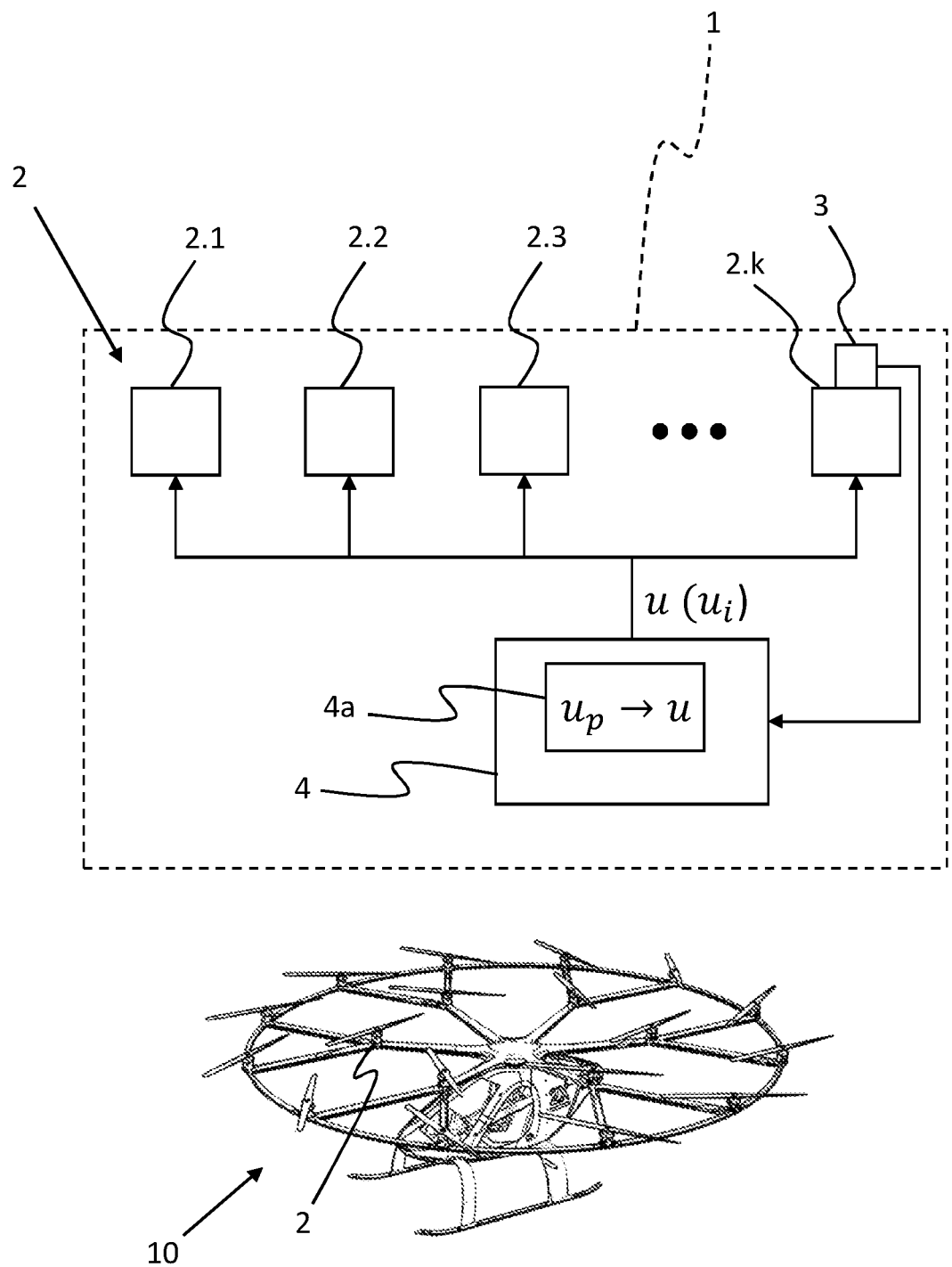
FIG. 1 shows an actuator system according to the invention.

In FIG. 1, reference numeral 1 denotes an actuator system comprising a plurality of actuators 2 denoted as a 2.$i$, $i=1, \ldots, k$; $k\in\mathbb{N}$. These actuators can be devised as individual propulsion units of an aircraft 10, in particular an electrically powered MAV-VTOL, as shown in exemplary fashion. Some or all of the actuators 2 can comprise sensor means 3 for determining use parameters (temperature, power consumption, noise level, RPM, torque, etc. of a respective actuator, e.g., actuator 2.$k$. Actuators 2 are controlled by (flight) control unit 4 comprising algorithm means 4$a$, which determine actuator commands u ($u_i$), i.e., a command vector with individual command components for each one of the actuators 2, from the desired command or pseudo command, which is denoted $u_p \rightarrow u$. Said actuator commands u ($u_i$) are employed to control the actuators 2 in order to achieve a given task, e.g., a flight manoeuvre, with the overall actuator system 1 (aircraft 10).

The sensor means 3 can be used to improve system performance by providing the control unit 4 with actuator feedback, as detailed above.

The present invention proposes to use weights for individual actuators 2 when a desired control command $u_p \in \mathbb{R}^m$, $m\in\mathbb{N}$, for controlling the actuator system is allocated to real actuator commands $u \in \mathbb{R}^k$, $k\in\mathbb{N}$. To this end, it makes use of a weighted allocation matrix $D(W)$, from an equation $u=D^{-1}(W)u_p$, wherein $D^{-1}(W)$ is an inverse of the weighted allocation matrix, and wherein the real actuator commands u are applied for controlling the actuators 2. Preferably, matrix $W=W(w_i)$ comprises individual actuator weights $w_i$ which depend on a deviation $e_i$ which is a normalized deviation determined by $$e_i = \text{normalized}(u_i - u^*) = \frac{(u_i - u^*)}{(u_{max} - u_{min})},$$

wherein $u_{max}$ is a (commandable) maximum value and $u_{min}$ is a (commandable) minimum value of the actuator commands u. The value $u^*$ preferably is a mean value of an entirety of the actuator commands u, i.e., $u^*=u_{mean}=$mean (u).

A weighting function can be used to determine the weights $w_i(e_i)$, according to which weighting function a weight $w_i$, $0 \leq w_i \leq 1$, is computed if a corresponding deviation $e_i$ is greater than zero, i.e., $e_i>0$.

A weight $w_i$ can be set to a default value, in particular $w_i=1$, if a corresponding deviation $e_i$ is equal to or smaller than zero, i.e., $e_i \leq 0$. Furthermore, a weight $w_i$ is reduced for an increasing value of the respective deviation $e_i$.

Figure 2:
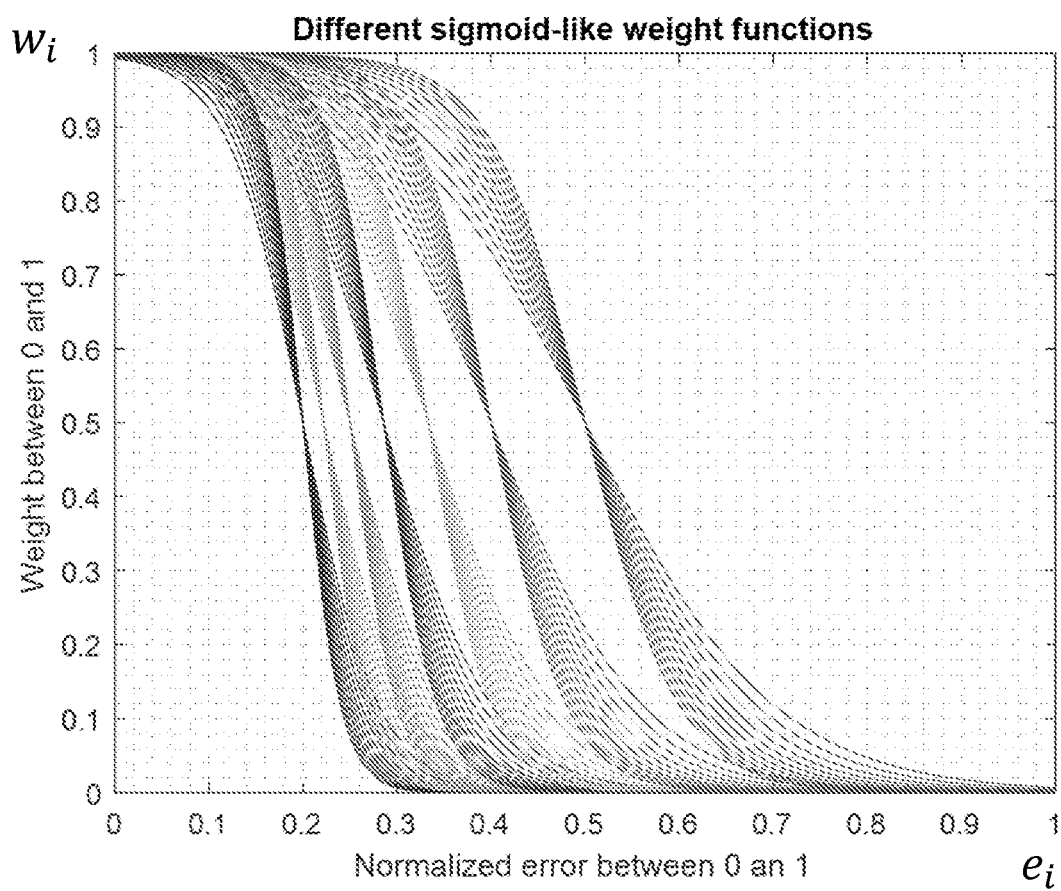
FIG. 2 shows a sigmoid-like weight function with different parameters.

FIG. 2 shows a possible, sigmoid-like weight function with different parameters. Analytical representation of the function is $$w_i = \frac{1}{1+e^{\alpha(\beta e_i-1)}},$$

for $5 \leq \alpha \leq 10$ and $2 \leq \beta \leq 5$. Note that $e_i$ is the always positive normalized error. "$e^x$" denotes the Euler exponential.

Figure 3:
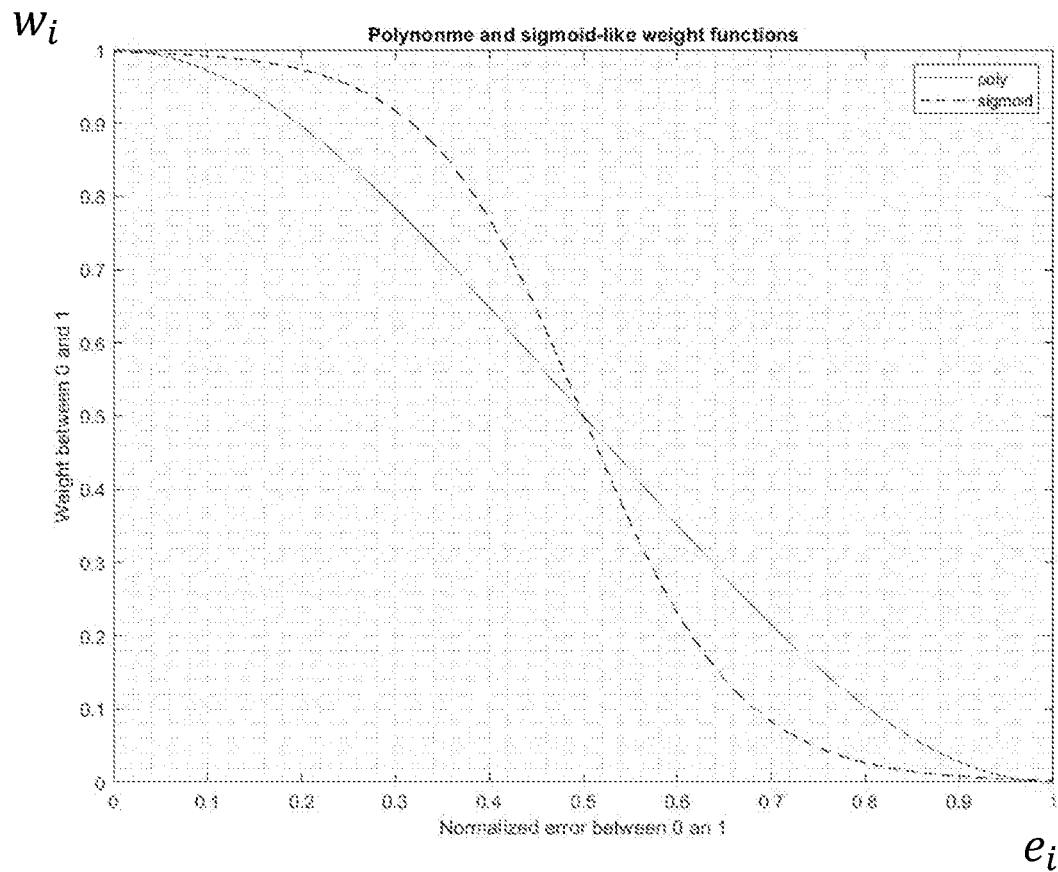
FIG. 3 shows a polynomial weighting function compared to a sigmoid-like weighting function.

FIG. 3 shows a possible, polynomial weighting function (solid line) $w_i=1-3e_i^2+2e_i^3$ (with shallower slope) and a sigmoid-like weighting function (dashed line, steeper slope)

$$w_i = \frac{1}{1+e^{\alpha(\beta e_i-1)}},$$

for $\alpha=6$ and $\beta=2$. Again, "$e^x$" denotes the Euler exponential and $e_i$ is the positive normalized error.

Figure 4:
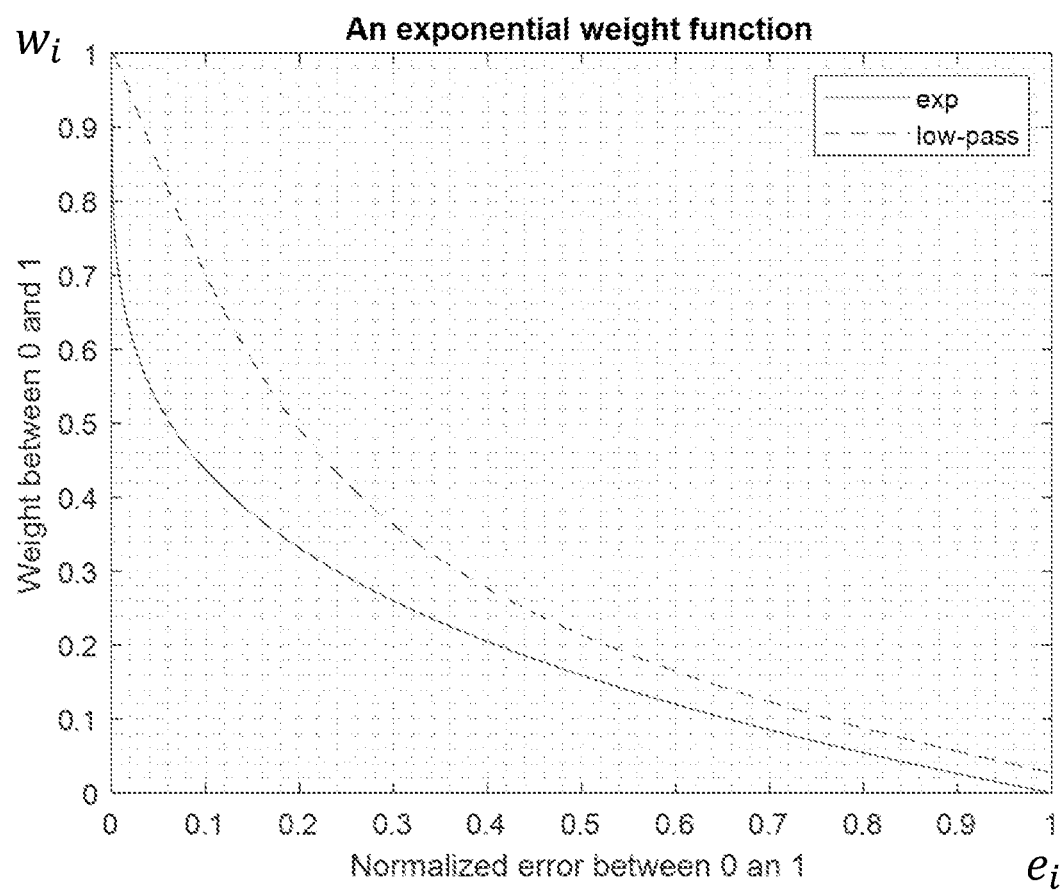
FIG. 4 shows an exponentially decaying weighting function and its low-pass filtered version.

FIG. 4 shows an exponentially decaying weighting function $$w_i = 1 - \frac{1}{e_i^\gamma},$$

for γ=4 (in solid line) and its low-pass filtered version (dashed line) via $w_i=(1-\sigma)w_i+\sigma w_i^{prev}$ for σ=0.99. Again, $e_i$ is the positive normalized error. Low-passed filtered weighting functions can be preferred because they can smooth out a discontinuity in the weighting algorithm (if/else), thus enhancing smoothness around zero error which is important. In particular, a low-pass filtered exponential weight function as shown in FIG. 4 provides smoothness in this region, as well as in case of other artificial discrete jumps in the weight function due to, e.g., other if/else commands in the algorithm. Hence, a low-pass filtered exponential function is particularly recommended.

Figure 5:
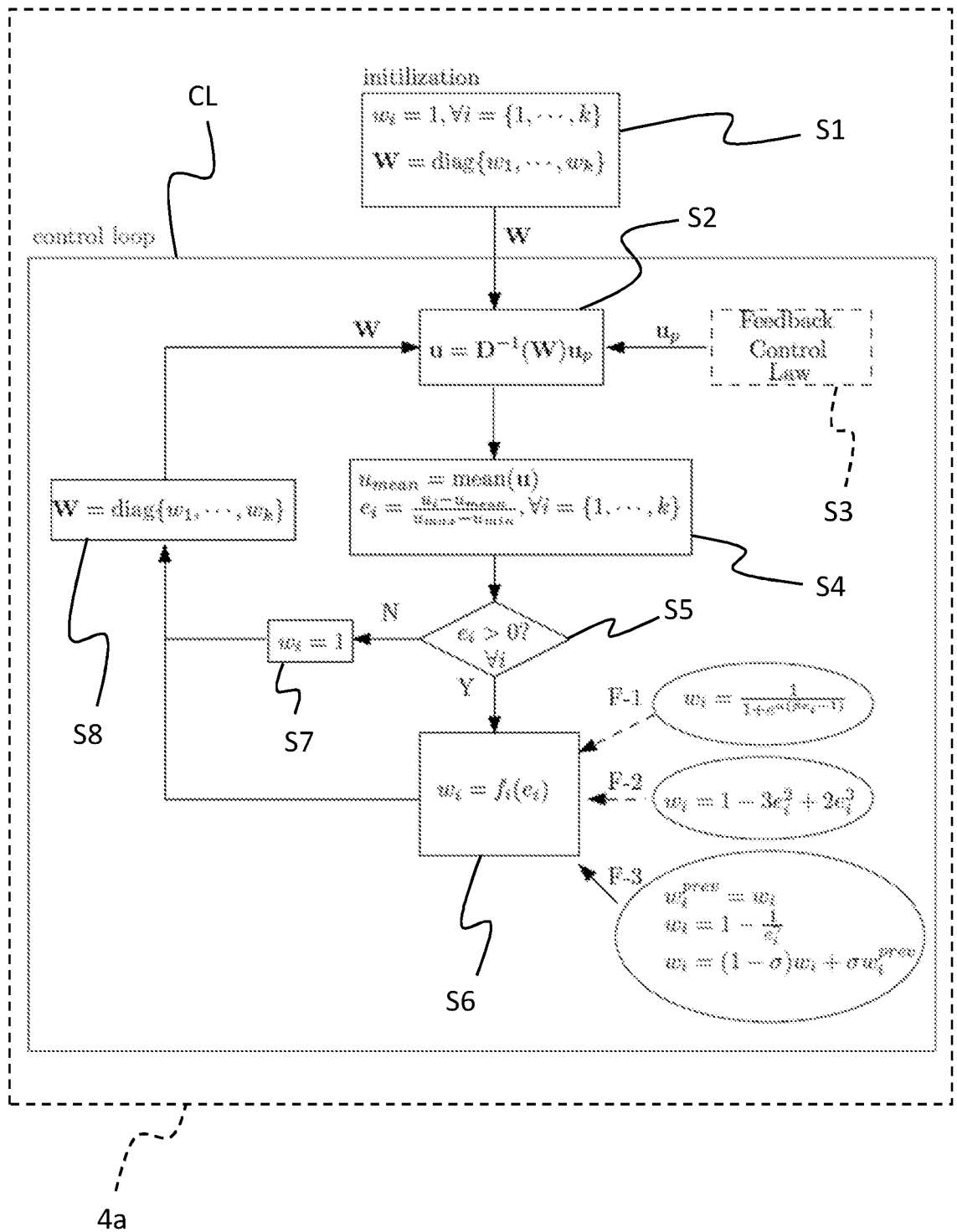
FIG. 5 shows an embodiment of the weighting algorithm.

FIG. 5 shows an implementation of a weighting algorithm 4a (cf. FIG. 1) for reduction of the maximum of the overall actuator commands (L-infinity) in an actuator system, as preferably used in the present invention. Step S1 is an initialization step. Initialization happens only once, while everything in box CL is in the control loop, i.e., these steps are performed repeatedly during actuator use. Initialized weight matrix W is then provided to allocation step S2, which calculates u from $u_p$, as shown. $u_p$ is derived from a (feedback) control law as shown in generic form at S3. At S4, the mean command value $u_{mean}$ and the deviations $e_i$ are calculated. At S5, it is determined whether $e_i$>0. If yes (Y), then the $w_i$ are calculated using a suitable weighting function at S6. Three different weighting functions are shown at F-1 through F-3. Note that this is done for each actuator i=1, . . . , k separately, depending on whether $e_i$>0 or not. If not (N), then $w_i$ (for a given actuator) is set to default value 1 at S7. The $w_i$ are used to fill new matrix W at S8, which is then used at S2 during allocation. Steps S2 through S8 are performed repeatedly during operation of the actuator system. The command vector u calculated at S2 is used to control the actuators 2 (cf. FIG. 1).

The invention claimed is:

1. A method of operating an actuator system (1) comprising a number k, k∈ℕ, of actuators (2), wherein a control command $u_p \in \mathbb{R}^m$, m∈ℕ, for controlling the actuator system (1) is allocated to actuator commands u∈$\mathbb{R}^k$, k∈ℕ, by using a weighted allocation matrix D(W), from an equation $u=D^{-1}(W)u_p$, wherein $D^{-1}(W)$ is an inverse of the weighted allocation matrix, and wherein the actuator commands u are applied for controlling the actuators (2), the method comprising:
 a) determining a value u* from the actuator commands u;
 b) determining, at least for some of the actuators (2), a deviation $e_i$, i=1, 2, . . . , k of a respective actuator command $u_i$, i=1, 2, . . . , k from said value u*;
 c) determining, at least for some of the actuators (2), preferably for all of the actuators (2), a weight $w_i$, i=1, 2, . . . , k for a given actuator (2) as a function $w_i(e_i)$, i=1, 2, . . . , k of said deviation $e_i$; and
 d) using the weights $w_i$ for determining said weighted allocation matrix D(W) to at least one of improve energy efficiency, reduce total energy consumption, reduce cost, reduce weight, or reduce size of the actuator system.

2. The method of claim 1, wherein said value u* is a mean value of an entirety of the actuator commands u, i.e., u*=$u_{mean}$=mean(u).

3. The method of claim 1, wherein said deviation $e_i$ is a normalized deviation determined by $$e_i = \text{normalized}(u_i - u^*) = \frac{(u_i - u^*)}{(u_{max} - u_{min})},$$

wherein $u_{max}$ is a maximum value and $u_{min}$ is a minimum value of the actuator commands u.

4. The method of claim 1, wherein a weight $w_i$ is computed if a corresponding deviation $e_i$ is greater than zero, i.e., $e_i$>0.

5. The method of claim 1, wherein a weight $w_i$ is set to a default value if a corresponding deviation $e_i$ is equal to or smaller than zero, i.e., $e_i$≤0.

6. The method of claim 1, wherein a weight $w_i$ is reduced for an increasing value of the respective deviation $e_i$.

7. The method of claim 1, wherein the weights $w_i$ which have been determined at a given time are used to solve the equation $u=D^{-1}(W)u_p$ during a subsequent iteration step of the method.

8. The method of claim 7, wherein the $w_i(e_i)$ are determined by using a weighting function, which weighting function is
 a) a sigmoid function, $w_i=1/((1+e^{\alpha(\beta e_i - 1)})$, e being the Euler exponential;
 b) a polynomial function, $w_i=\Sigma_j \alpha_j e_i^j$; or
 c) an exponential function, $1-1/e_i^\gamma$.

9. The method of claim 8, wherein the weighting function is low-pass filtered, via $$w_i=(1-\sigma)w_i+\sigma w_i^{prev},$$

with α<1, wherein prev denotes a previous weight from a preceding iteration step in the operating method.

10. An actuator system (1) comprising:
 a number k, k∈ℕ, of actuators (2),
 a control unit (4) for controlling the actuator system (1) configured with a control command $u_p \in \mathbb{R}^m$, m∈ℕ, which control command is allocated, by said control unit (4), to actuator commands u∈$\mathbb{R}^k$, k∈ℕ, by using a weighted allocation matrix D(W), from an equation $u=D^{-1}(W)u_p$, wherein $D^{-1}(W)$ is an inverse of the weighted allocation matrix, and the actuator commands u are applied, by the control unit (4), to the actuators (2), the control unit (4) being configured to implement
 a) determining a value u* from the actuator commands u;
 b) determining, at least for some of the actuators (2), a deviation $e_i$, i=1, 2, . . . , k of a respective actuator command $u_i$, i=1, 2, . . . , k from said value u*;
 c) determining, at least for some of the actuators (2), a weight $w_i$, i=1, 2, . . . , k for a given actuator (2) as a function $w_i(e_i)$, i=1, 2, . . . , k of said deviation $e_i$; and
 d) using the weights $w_i$ for determining said weighted allocation matrix D(W) to at least one of improve energy efficiency, reduce total energy consumption, reduce cost, reduce weight, or reduce size of the actuator system.

11. The actuator system (1) of claim 10, wherein the control unit (4) is further configured such that said value u* is a mean value of an entirety of the actuator commands u, i.e., u*=$u_{mean}$=mean(u).

12. An aircraft (10) in the form of a multiactuator aerial vehicle, MAV, with vertical take-off and landing, VTOL, capacity comprising:
 a plurality of k, k∈ℕ, actuators (2) provided as propulsion units for moving the aircraft (10);
 a flight control unit (4) configured to control the actuators (2) with a control command $u_p \in \mathbb{R}^m$, m∈ℕ, which control command is allocated, by said flight control unit (4), to actuator commands u∈$\mathbb{R}^k$, k∈ℕ, by using a weighted allocation matrix D(W), from an equation $u=D^{-1}(W)u_p$, wherein $D^{-1}(W)$ is an inverse of the weighted allocation matrix, and wherein the actuator commands u are applied, by the control unit (4), to the actuators (2), the flight control unit (4) being configured to implement a) determining a value u* from the actuator commands u;

b) determining, at least for some of the actuators (2), preferably for all of the actuators (2), a deviation $e_i$, i=1, 2, ..., k of a respective actuator command $u_i$, i=1, 2, ..., k from said value u*;

c) determining, at least for some of the actuators (2), preferably for all of the actuators (2), a weight $w_i$, i=1, 2, ..., k for a given actuator (2) as a function $w_i(e_i)$, i=1, 2, ..., k of said deviation $e_i$; and d) using the weights $w_i$ for determining said weighted allocation matrix D (W) to at least one of improve energy efficiency, reduce total energy consumption, reduce cost, reduce weight, or reduce size of the aircraft.

13. The aircraft (10) of claim 12, wherein the flight control unit (4) is further configured such that said value u* is a mean value of an entirety of the actuator commands u, i.e., $u^* = u_{mean} = \text{mean}(u)$.

14. The aircraft (10) of claim 12, wherein the propulsion units are electrically powered.

15. The aircraft (10) of claim 12, wherein the flight control unit (4) is connected to a sensor system of the aircraft to determine said control command $u_p \in \mathbb{R}^m$, $m \in \mathbb{N}$, from a control law.

* * * * *